United States Patent
Cariou et al.

(10) Patent No.: US 10,028,303 B2
(45) Date of Patent: Jul. 17, 2018

(54) CLEAR CHANNEL ASSESSMENT (CCA) IN WIRELESS NETWORKS

(71) Applicant: Intel IP Corporation, Santa Clara, CA (US)

(72) Inventors: Laurent Cariou, Portland, OR (US); Carlos Cordeiro, Portland, OR (US); Solomon Trainin, Haifa (IL)

(73) Assignee: Intel IP Corporation, Santa Clara, CA (US)

( * ) Notice: Subject to any disclaimer, the term of this patent is extended or adjusted under 35 U.S.C. 154(b) by 139 days.

(21) Appl. No.: 15/088,591

(22) Filed: Apr. 1, 2016

(65) Prior Publication Data

US 2017/0118774 A1    Apr. 27, 2017

Related U.S. Application Data

(60) Provisional application No. 62/246,179, filed on Oct. 26, 2015.

(51) Int. Cl.
*H04W 74/08* (2009.01)
*H04W 74/00* (2009.01)
(Continued)

(52) U.S. Cl.
CPC ..... *H04W 74/0816* (2013.01); *H04W 74/002* (2013.01); *H04W 84/12* (2013.01); *H04W 88/08* (2013.01)

(58) Field of Classification Search
CPC .......... H04W 74/002; H04W 74/0816; H04W 84/12; H04W 88/08; H04W 74/0808–74/0825
See application file for complete search history.

(56) References Cited

U.S. PATENT DOCUMENTS 6,151,513 A * 11/2000 Petry ............... H01Q 25/00
                                                         342/373
6,771,989 B1 * 8/2004 Katz ................ H04B 7/0608
                                                         455/561
(Continued)

FOREIGN PATENT DOCUMENTS

WO    2014124237    8/2014

OTHER PUBLICATIONS

International Search Report and Written Opinion for PCT Application No. PCT/US2016/054456, dated Jan. 2, 2017, 10 pages.

*Primary Examiner* — Dung B Huynh
(74) *Attorney, Agent, or Firm* — Eversheds Sutherland (US) LLP

(57) ABSTRACT

This disclosure describes methods, apparatus, and systems related to providing a source device more degrees of freedom in the performing CCA, and in using CCA for communicating with neighboring devices. Before accessing the channel, a source device may need to perform carrier sense multiple access with collision avoidance (CSMA/CA), the CSMA/CA additionally comprising CCA. In various embodiments, CCA can be performed either using quasi-omnidirectional receiving antenna(s), or using directional receiving antenna(s). In one embodiment, one or more requisite conditions for performing directional CCA can be specified. In another aspect, sensitivity level adjustments can be provided when performing directional CCA and/or quasi-omnidirectional CCA.

20 Claims, 7 Drawing Sheets

(51) Int. Cl.
*H04W 88/08* (2009.01)
*H04W 84/12* (2009.01)

(56) References Cited

U.S. PATENT DOCUMENTS

| | | | | |
|---|---|---|---|---|
| 9,584,198 | B1* | 2/2017 | Tujkovic | H04B 7/0413 |
| 2001/0046883 | A1* | 11/2001 | Jechoux | H01Q 1/246 |
| | | | | 455/562.1 |
| 2002/0128027 | A1* | 9/2002 | Wong | H04B 7/0408 |
| | | | | 455/513 |
| 2004/0166901 | A1* | 8/2004 | Umesh | H04W 72/0466 |
| | | | | 455/561 |
| 2005/0063340 | A1* | 3/2005 | Hoffmann | H04W 16/28 |
| | | | | 370/332 |
| 2005/0141545 | A1* | 6/2005 | Fein | H04B 7/0617 |
| | | | | 370/445 |
| 2006/0172711 | A1* | 8/2006 | King | H04B 7/061 |
| | | | | 455/101 |
| 2006/0268816 | A1* | 11/2006 | Adachi | H04W 76/023 |
| | | | | 370/347 |
| 2008/0117865 | A1* | 5/2008 | Li | H04W 74/0808 |
| | | | | 370/329 |
| 2008/0125109 | A1* | 5/2008 | Larsson | H04L 25/03343 |
| | | | | 455/424 |
| 2008/0299918 | A1* | 12/2008 | Jallon | H04L 5/0037 |
| | | | | 455/103 |
| 2009/0016312 | A1* | 1/2009 | Tao | H04B 7/0404 |
| | | | | 370/344 |
| 2009/0124290 | A1* | 5/2009 | Tao | H04B 7/0874 |
| | | | | 455/562.1 |
| 2009/0135064 | A1 | 5/2009 | Sim et al. | |
| 2010/0265922 | A1* | 10/2010 | Bracha | H04W 74/0808 |
| | | | | 370/336 |
| 2012/0051338 | A1 | 3/2012 | Seok | |
| 2013/0189929 | A1* | 7/2013 | Takahashi | G01S 3/38 |
| | | | | 455/67.7 |
| 2014/0018005 | A1 | 1/2014 | Sofer et al. | |
| 2014/0218236 | A1* | 8/2014 | Sadeghi | H04W 16/28 |
| | | | | 342/367 |
| 2015/0195790 | A1* | 7/2015 | Rong | H04W 52/243 |
| | | | | 370/311 |
| 2015/0264583 | A1* | 9/2015 | Sundstrom | H04W 16/28 |
| | | | | 342/373 |
| 2015/0289147 | A1 | 10/2015 | Lou et al. | |
| 2016/0066197 | A1* | 3/2016 | Park | H04W 16/28 |
| | | | | 370/329 |
| 2016/0157264 | A1* | 6/2016 | Wang | H04W 72/1257 |
| | | | | 370/329 |
| 2016/0174206 | A1* | 6/2016 | Xia | H04B 7/0491 |
| | | | | 370/329 |
| 2017/0006629 | A1* | 1/2017 | Jung | H04W 16/28 |
| 2017/0034838 | A1* | 2/2017 | Trainin | H04W 16/14 |
| 2017/0086226 | A1* | 3/2017 | Wang | H04W 74/0808 |
| 2017/0163395 | A1* | 6/2017 | Kwak | H04L 5/0048 |
| 2017/0164406 | A1* | 6/2017 | Son | H04W 74/0816 |

* cited by examiner

CLEAR CHANNEL ASSESSMENT (CCA) IN WIRELESS NETWORKS

CROSS REFERENCE TO RELATED APPLICATION

This application claims the benefit of U.S. Patent Application No. 62/246,179 filed on Oct. 26, 2015, the disclosure of which is incorporate herein by reference as set forth in full.

TECHNICAL FIELD

This disclosure generally relates to systems and methods for wireless communications and, more particularly, to the use of clear channel assessment (CCA) in wireless Networks.

BACKGROUND

Wireless devices are becoming widely prevalent and are increasingly requesting access to wireless channels. In wireless networks, a given source device (interchangeably referred to as a source (SRC) station (STA) herein), can transmit and receive data in a directional manner (e.g., radiate or receive greater power in specific directions).

DETAILED DESCRIPTION

Figure 1:
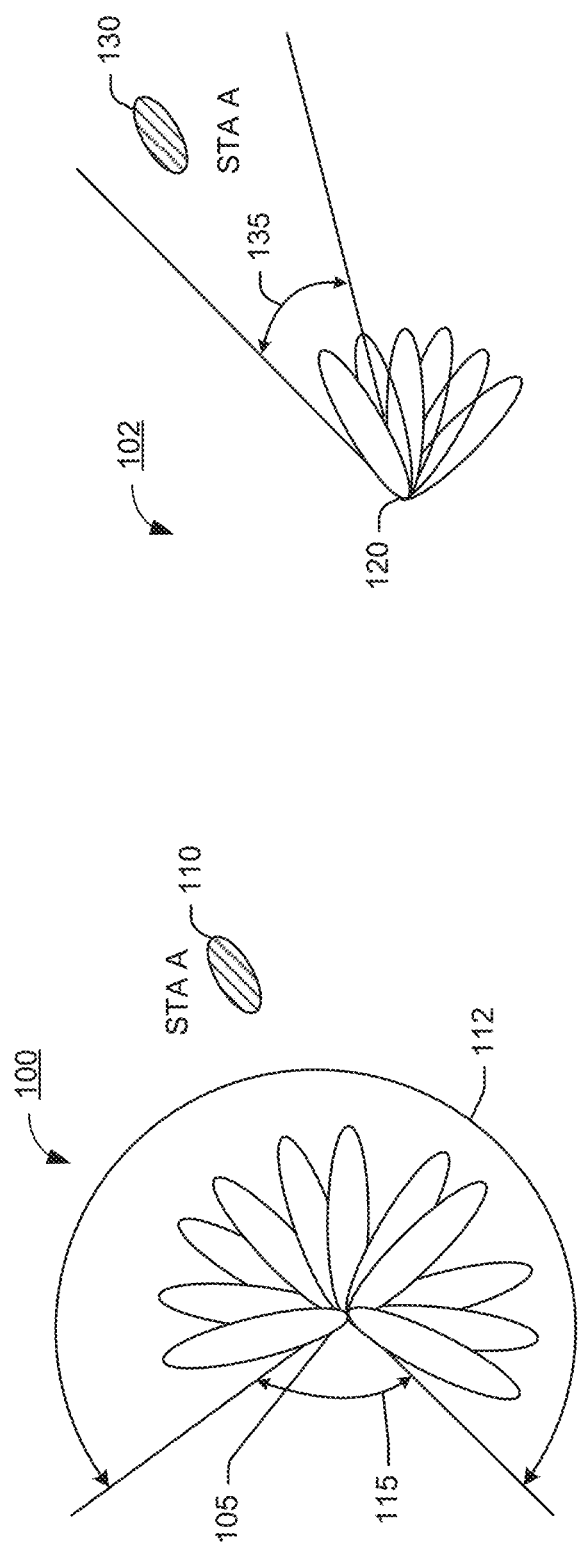
FIG. 1 shows a diagram that illustrates a quasi-omnidirectional Clear Channel Assessment (CCA) transmission of data by a source device and a directional CCA transmission by a source device, in accordance with one or more example embodiments of the disclosure.

Example embodiments described herein provide certain systems, methods, and devices, for providing signaling information to Wi-Fi devices in various Wi-Fi networks, including, but not limited to, IEEE 802.1 lad and IEEE 802.11ay.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In various embodiments, the systems and methods disclosed herein can be directed to IEEE 802.11ay, though they can be applied, at least in part, to systems and methods using 802.11ad and/or other Wi-Fi standards. IEE 802.11ay can refer to the next generation of wireless standards proceeding IEEE 802.11ad. In wireless networks, a given source device (interchangeably referred to as a source (SRC) station (STA) herein), can transmit and receive data in a directional manner (e.g., radiate or receive greater power in specific directions). Before accessing a channel on which to transmit data, the source device may need to check if the channel is not being used by other transmitting and/or receiving devices. For example, the source device can perform this check using a contention-based protocol (CBP), a communications protocol that allows many users to use the same radio channel without pre-coordination. One example of a CBP can be a Clear Channel Assessment (CCA). The source device can determine that the channel is available by performing a CCA and obtaining a CCA status that the channel is idle. In other examples, the source device can additionally perform CCA using a directional antenna (directional CCA) or a quasi-omnidirectional antenna (quasi-omnidirectional CCA).

If the quasi-omnidirectional antenna performing the CCA is busy because of signal reception in a direction not being used by the source device, data transmission/reception efficiency in the network may be reduced. For example, this may be due to the source device being unable to access the channel, determining the channel to be unavailable when in fact the channel could still have been used in the direction not being used by the source device.

Disclosed herein are systems and methods that are directed to providing a source device more degrees of operational freedom in the performing CCA, and in using CCA for communicating with neighboring devices. Before accessing the channel, a source device, such as an STA or an AP, may need to perform carrier sense multiple access with collision avoidance (CSMA/CA), the CSMA/CA additionally comprising CCA. In various embodiments, CCA can be performed either using quasi-omnidirectional receiving antenna(s), or using directional receiving antenna(s). In one embodiment, one or more requisite conditions for performing directional CCA can be specified. In another aspect, sensitivity level adjustments can be provided when performing directional CCA and/or quasi-omnidirectional CCA.

Directional CCA can enable better channel reuse among source devices and other STAs and APs. For example, such channel reuse can refer to a source device directionally transceiving data when quasi-omnidirectional CCA returns a busy signal for devices communicating in a direction not being simultaneously used by the source device. In dense environments, this can increase the reuse potential of transmissions, for example, transmissions at approximately 60 GHz.

FIG. 1 shows a diagram that illustrates aspects of a quasi-omnidirectional CCA 100 and a directional CCA 102, in accordance with the disclosure. Referring to FIG. 1, in the quasi-omnidirectional CCA 100, a source device 105 can perform a CCA in a quasi-omnidirectional manner. This means that the source device 105 can check for channel availability in several directions, while neglecting some other directions in a particular angular range 115. Data transmission and reception by given device, e.g., STA A 110, may be detected as a result of the quasi-omnidirectional CCA 112. In this case the CCA will return an idle or a busy indication for the given device (for example, STA A 110). In some aspects, the source device 105 can follow up with the given device to determine why it was busy, for example, to determine whether the device 110 intended to transmit data to the source device 105, or the device 110 was transmitting data to another device (not shown). In the directional CCA 102, the source device 120 can perform the CCA in a directional manner. This can mean that the source device 120 can check the channel availability in a pre-determined direction of angular range 135. Data transmission and reception by given device, for example, STA A 130, may be detected as a result of the CCA. In this case the CCA will return an idle or a busy indication for the given device (for example, STA A 130). In some aspects, the source device can follow up with the given device 130 to determine why the device 130 was busy, for example, to determine whether the device 130 attempted to transmit data to the source device 120, or the device 130 was transmitting data to another device (not shown). Moreover, in some embodiments, if a subsequent data transmission is performed in a given direction with a given aperture angle, the directional CCA can be performed in the same direction and with an aperture angle at least as large as the one used for the subsequent data transmission. This can be done to ensure the validity of the directional CCA results.

Figure 2:
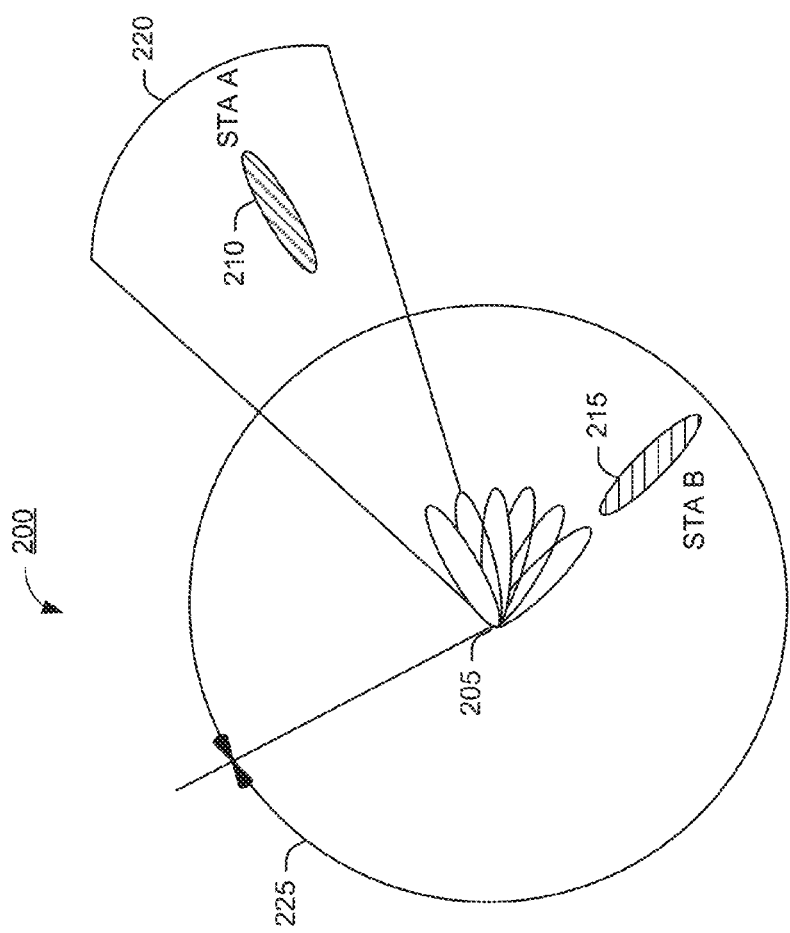
FIG. 2 shows a diagram that illustrates channel reuse by source stations (STAs), in accordance with one or more example embodiments of the disclosure.

FIG. 2 shows a diagram 200 illustrating a situation where a given source device 205 can reuse channels in a given direction while receiving an interfering signal in a different direction, in accordance with the present disclosure. In particular, the source device 205 can perform beamforming (e.g., determine one or more spatial beams between the source device and other devices) as part of a pre-association or association process with various devices in its neighborhood (for example, STA A 210 and STA B 215, among other devices, not shown) to determine the directions and angles for transmission and reception of data to the devices. The source device 205 can then determine to send data to a given device, such as STA A 210. In order to so, the source device 205 can first perform a directional CCA on angular range 220 to detect incoming signals from device A 210, and perform a quasi-omnidirectional CCA on angular range 225 to detect signals potentially coming from other devices, such as device B 215. The result of the CCAs can be result in four scenarios.

In one embodiment, a first possibility may be that the directional CCA on the angular range 220 returns an idle for device A 210, and the quasi-omnidirectional CCA on angular range 225 returns an idle for device B 215, indicating that the source device 205 is clear to send data to device A 210 without any interference from device B 215. In this case, the source device 205 can send the data to device A 210.

In another embodiment, a second possibility may be that the directional CCA on angular range 220 results in device A 210 returning a busy and the quasi-omnidirectional CCA on angular range 225 results in device B 215 returning an idle. In this case, the source device 205 can further determine why device A 210 is busy. The source device 205 can, for example, obtain a data packet from device A 210 and attempt to decode the header. If the source device 205 cannot decode the header, for example because the source device 205 missed the header and is receiving the data mid-stream, then the source device 205 can defer the transmission to device A 210; additionally the source device 205 can send data to device B 215 since device B 215 returned an idle. If the source device 205 decodes the header of the data packet received from device A 210 and determines that the data is designated for the source device 205, then the source device 205 can defer its data transmission to device A 210 and instead receive the incoming data from device A 210. If the source device 205 decodes the header of the data packet received from device A 210 and determines that the data from device A 210 is designated for another device (not shown), the source device 205 can again defer its transmission of data to device A 210; additionally source device 205 can send data to device B 215 since device B 215 returned an idle status from the quasi-omnidirectional CCA 225.

In another embodiment, a third possibility may be that the directional CCA on angular range 220 results in device A 210 being idle while the quasi-omnidirectional CCA on angular range 225 results in device B 215 having a busy status. In this case the source device 205 can further determine why device B 215 is busy. The source device 205 can, for example, obtain a data packet from device B 215 and attempt to decode the header of the data packet. If the source device 205 cannot decode the header, for example, because the source device 205 missed the header and is receiving the data mid-stream, then the source device 205 can ignore the busy signal from device B 215 and continue to transmit to device A 210. If the source device 205 successfully decodes the header from the data packet received from device B 215 and determines that the data from device B 215 is designated for the source device 205, then the source device 205 can receive the data from device B 215 and defer data transmission to device A 210. If the source device 205 successfully decodes the header and determines that device B 215 is sending data to another device (not shown), then the source device 205 can ignore the busy signal from device B 215 and continue to transmit to device A 210.

In another embodiment, a fourth possibility may be that the directional CCA on the angular range 220 results in device A 210 having a busy status and the quasi-omnidirectional CCA on the angular range 225 resulting in device B 215 also having a busy status. In this case the source device can determine why devices A 210 and device B 215 return busy. The source device 205 may choose to perform the determination in any order, for example, based on a previously established protocol based on device priority. For example, the source device 205 can first receive a data packet from device A 210. The source device 205 can then attempt to decode the header of the received data packet. If the source device 205 cannot decode the header, for example because the source device 205 missed the header and is receiving the data midstream, then the source device 205 can defer the transmission to device A 210. If the source device 205 successfully decodes the header and determines that the data is designated for the source device 205, then the source device 205 can defer its data transmission to device A 210 and instead receive the incoming data from device A 210. Next, the source device can receive a data packet from device B 215. The source device 205 can then attempt to decode the header of the received data packet. If the source device 205 cannot decode the header, for example, because the source device 205 missed the header and is receiving the data midstream, then the source device 205 can defer the transmission to device B 215. If the source device 205 successfully decodes the header and determines that the data is designated for the source device 205, then the source device 205 can defer its data transmission to device B 215 and instead receive the incoming data from device B 215. If upon successfully decoding the header of the data packets from either device A 210 and/or device B 215, the source device 205 determines that the data is not designated for the source device 205, for example, because the data is designated for a third device (not shown), the source device 205 can defer its transmission to either or both device A 210 and device B 215 for a pre-determined period of time, before re-performing the CCA.

In various embodiments, the CCA can be performed with a single CCA by the source device 205, as described above. In other embodiments, the CCA can be performed with multiple CCAs by the source device 205. For example, one CCA can be used to characterize the channel as idle or busy for a first device, e.g., device A 210 while another CCA can be used to characterize the channel as idle or busy for a second device, e.g., device B 215. The CCAs can be directional for directional communications, e.g., the communication between the source device 205 and device A 210. The CCAs can be quasi-omnidirectional or fully omnidirectional for quasi-omnidirectional or fully omnidirectional communications, e.g. the communication between the source device 205 and device B 215.

In one embodiment, when performing directional CCA (e.g., directional CCA on angular range 220 with STA A 210), the source device 205 may need to ensure that the directional CCA covers at least the area and/or angle on which the subsequent data transmission will transmit and/or receive energy above a pre-determined threshold. In another embodiment, for devices that do not have a reciprocal reception and transmission antennas, a calibration may be needed.

In various embodiments, a CCA range can be used as a threshold for the determination of the status of the CCA (whether directional or omnidirectional CCA). For example, the CCA range can be defined as the sensitivity for Modulation and Coding Scheme index 1 (MCS1) physical (PHYS) control with a quasi-omnidirectional receiver, which can be approximately −68 dBm. For example, if the power detected by the receiver of the source device performing a CCA in a directional or quasi-omnidirectional reception is below the threshold (e.g., approximately −68 dBm), then the status of the CCA can be determined to be idle. Alternatively, if the power detected by the receiver of the source device performing a CCA in a directional, quasi-omnidirectional reception is above the threshold (e.g., approximately −68 dBm), then the status of the CCA can be determined to be busy.

In another aspect, FIG. 2 further utilizes directional antennas (not shown) to perform directional CCA 220 on an angular range that may have a higher antenna gain than quasi-omnidirectional antennas used to perform quasi-omnidirectional CCA 225 on a larger angular range. Thus, the range of directional CCA 220 can be greater than the range of quasi-omnidirectional CCA 225. The range difference can be proportional to the distance relative to the antenna gain difference between quasi-omnidirectional reception and directional reception. Thus directional CCAs 220 performed by the source device 205 can lead to a higher propensity to return busy results than quasi-omnidirectional CCAs 225. In one embodiment, therefore, the gain of the directional CCAs 220 can be normalized, such that the difference in gain for the directional CCA 220 and the quasi-omnidirectional CCA 225 for a given receiver (e.g., STA A 210 and STA B 215) is impartial to the type of CCA (e.g., quasi-omnidirectional or directional). When performing directional CCA 220, the CCA threshold can be adjusted by the difference between quasi-omnidirectional reception gain and directional reception gain, e.g., $CCA_{Directional} = CCA_{Quasi-omnidirectional} \Delta_{Antenna\ gain}$.

Figure 3A:
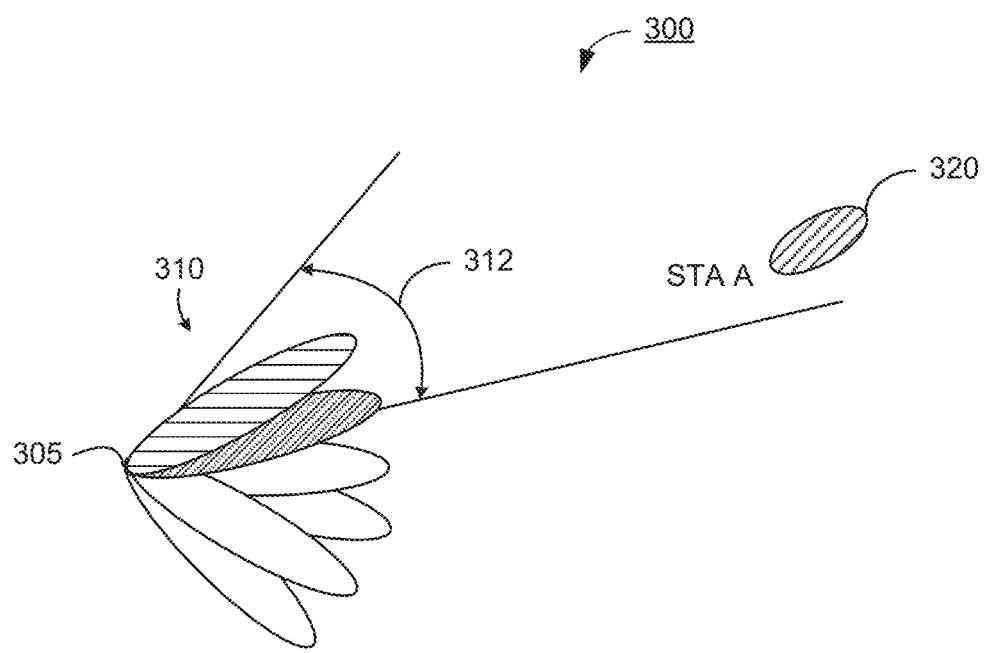
FIGS. 3A and 3B shows diagrams illustrating directional CCAs in two directions, in accordance with one or more example embodiments of the disclosure.
Figure 3B:
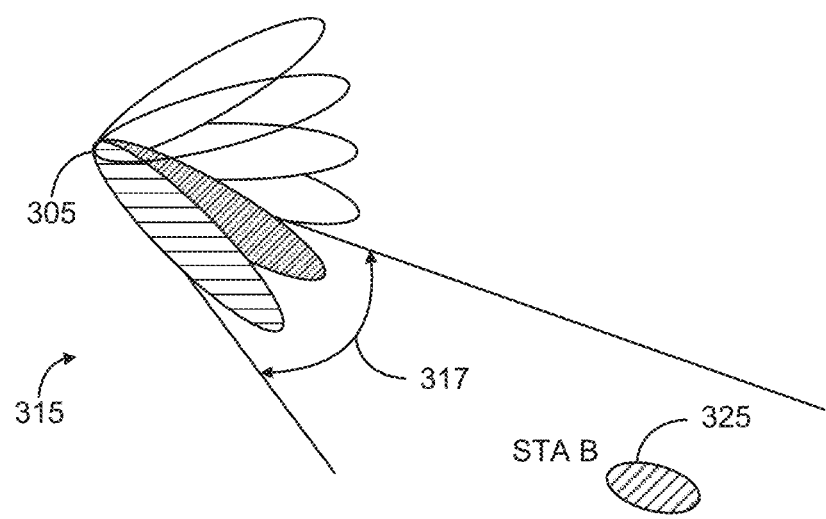

In various aspects, the systems and methods disclosed herein can be used in conjunction with multiple-input and multiple-output (MIMO) case or multi-user (MU) MIMO transmission, where multiple reception and transmission antennas may be synchronized. In one aspect, FIG. 3 represents a diagram 300 showing that for a MIMO or MU MIMO case, a bi-directional CCA can be performed by a source device 305 using two antennas (not shown) that are beamformed in different directions, e.g., a first directional CCA 310 (FIG. 3A) on an angular range 312 and a second directional CCA 315 (FIG. 3B) on an angular range 317. In one embodiment, if the result of the bi-directional CCA of the source device 305 is that either device (STA) A 320 or device B 325 are busy, then the source devices 305 can defer transmission of data until both device A 320 and device B 325 are idle. In another aspect the first and second directional CCAs 310 and 315 can be the same or different CCAs and can be used to determine that one device (device A 320 or device B 325 is busy and the other idle. Moreover, the directional CCAs 310 and 315 can be sent at substantially the same time or at different times. Data can be sent accordingly to the device that is idle, while deferring transmission to the device that is busy. In a further embodiment (not shown in FIG. 3) multiple CCAs can be sent to the same receiving device (e.g., device A 320, or device B 325) by multiple source devices. In various aspects, deferring transmission can refer to one or more of the steps of delaying transmission for a pre-determined time, performing the CCA one or more times to determine an idle status for the receiving device after the delay, and sending the transmission when the receiving device is idle. Optionally, the deferring can comprise cancelling the transmission by the source device at any time for any reason.

In one aspect, for the multi-directional case, the source device may need to ensure that the directional CCA covers at least the area and aperture angle for which the subsequent transmission will transmit energy above a pre-determined threshold.

Figure 4:
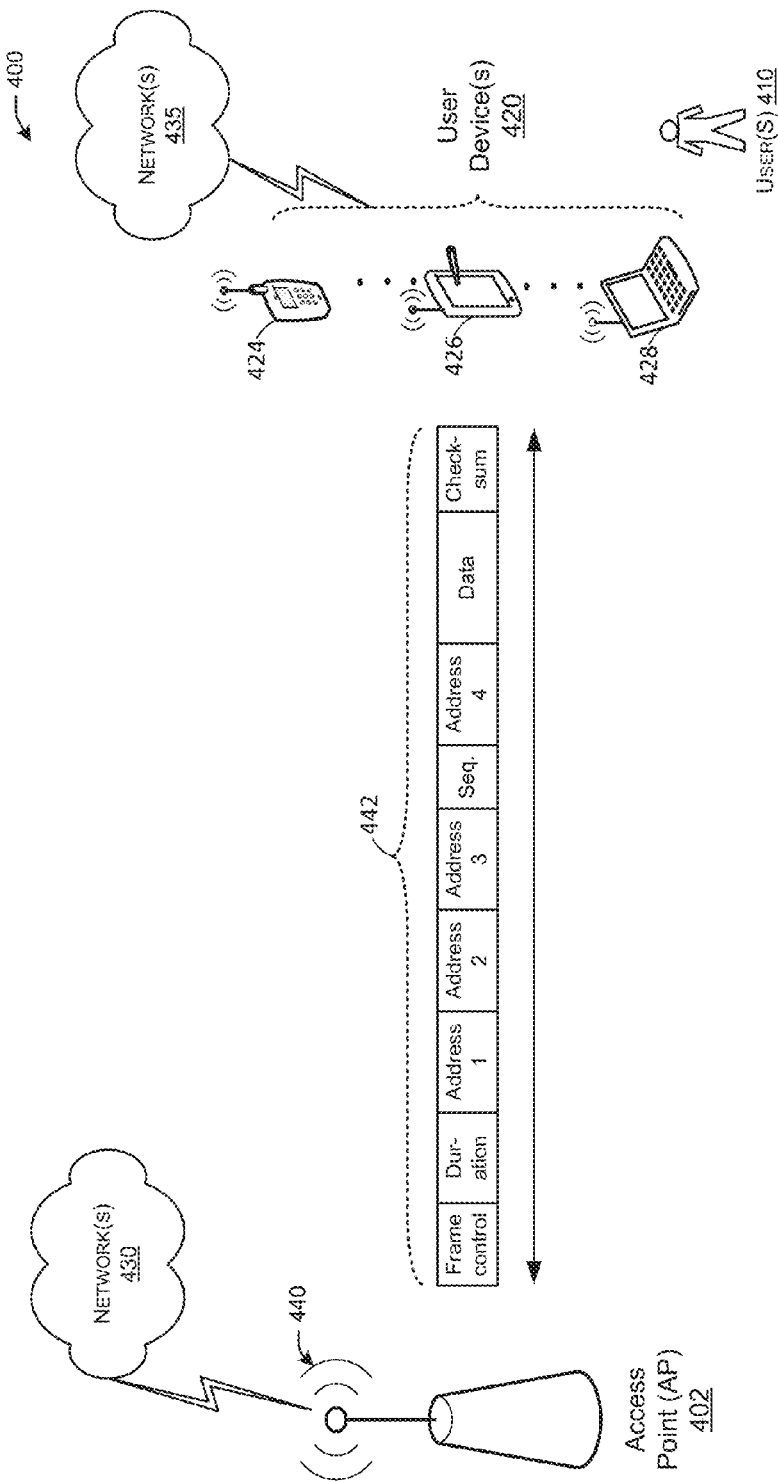
FIG. 4 shows an example networking environment, in accordance with one or more example embodiments of the disclosure.

FIG. 4 is a network diagram illustrating an example network environment, according to some example embodiments of the present disclosure. Wireless network 400 may include one or more devices 420 and one or more access point(s) (AP) 402, which may communicate in accordance with IEEE 802.11 communication standards, including IEEE 802.11ad and/or IEEE 802.11ay. The device(s) 420 may be mobile devices that are non-stationary and do not have fixed locations.

The user device(s) 420 (e.g., user devices 424, 426, or 428) may include any suitable processor-driven user device including, but not limited to, a desktop user device, a laptop user device, a server, a router, a switch, an access point, a smartphone, a tablet, wearable wireless device (e.g., bracelet, watch, glasses, ring, etc.) and so forth. In some embodiments, the user devices 420 and AP 402 may include one or more computer systems similar to that of the functional diagram of FIG. 6 and/or the example machine/system of FIG. 7, to be discussed further.

Returning to FIG. 4, any of the user device(s) 420 (e.g., user devices 424, 426, 428), and AP 402 may be configured to communicate with each other via one or more communications networks 430 and/or 435 wirelessly or wired. Any of the communications networks 430 and/or 435 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 430 and/or 435 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 430 and/or 435 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 420 (e.g., user devices 424, 426, 428), and AP 402 may include one or more communications antennae. Communications antenna may be any suitable type of antenna corresponding to the communications protocols used by the user device(s) 420 (e.g., user devices 424, 424 and 428), and AP 402. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 420.

Any of the user devices 420 (e.g., user devices 424, 426, 428), and AP 402 may include any suitable radio and/or transceiver for transmitting and/or receiving radio frequency (RF) signals in the bandwidth and/or channels corresponding to the communications protocols utilized by any of the user device(s) 420 and AP 402 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad and 802.11ay). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

The AP can perform CCA 440 (e.g., directional or omnidirectional CCA) prior to transmitting and/or receiving data from user devices 420 (e.g., user devices 424, 426, and/or 428). Typically, when an AP (e.g., AP 402) establishes communication with one or more user devices 420, the AP may communicate in the downlink direction by sending data frames (e.g. data frame 442). The data frames may be preceded by one or more preambles that may be part of one or more headers. These preambles may be used to allow the user device to detect a new incoming data frame from the AP. A preamble may be a signal used in network communications to synchronize transmission timing between two or more devices (e.g., between the APs and user devices).

Figure 5:
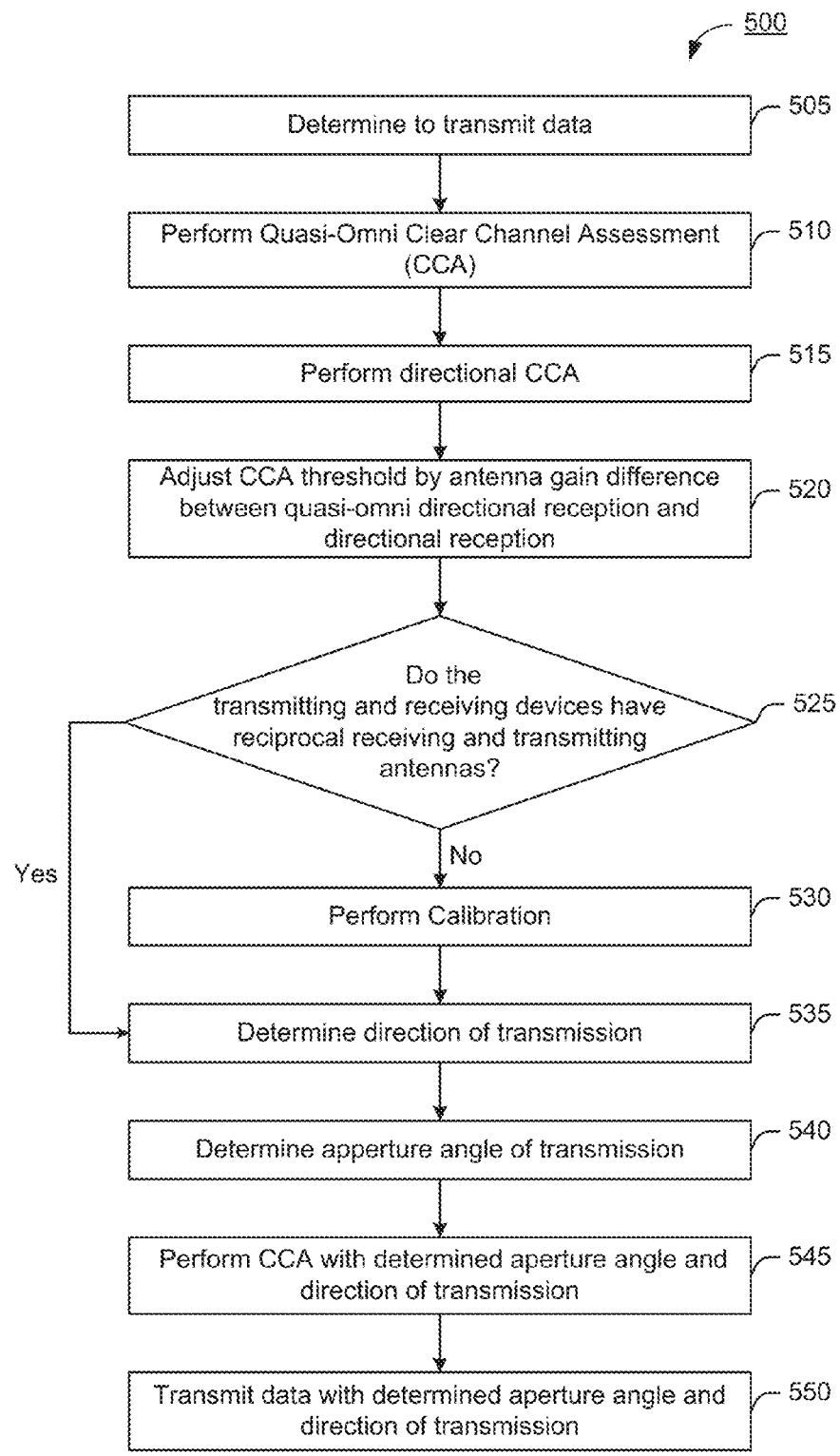
FIG. 5 shows a flow chart of aspects of the operation of an exemplary source device, in accordance with one or more example embodiments of the disclosure.

FIG. 5 shows a flow chart of aspects of the operation of an exemplary source device in accordance with the disclosure. In block 505, the source device (e.g., an AP 402 of FIG. 4) can determine to transmit data. The determination can be based on, for example, a user input, by changing network conditions, and the like. In block 510, the source device can perform a quasi-omnidirectional CCA to determine whether a communications channel between the source device and a given receiving device (e.g., user device 424, 426, or 428 of FIG. 4) is available. Then in block 515, the source device can perform a directional CCA, for example, in the direction of a given receiving device. If the directional and/or quasi-omnidirectional CCAs result in a determination that the channel is available for communication, then in block 520, the source device can adjust a threshold associated with the CCA. It can do so, for example, by adjusting the threshold based on the antenna gain difference between the quasi-omnidirectional reception and directional reception. Next in block 525, the source device can determine whether the source device and the receiving device have reciprocal reception/transmission antennas. If they do not have reciprocal reception/transmission antennas, then in block 530, the source device can perform a calibration; afterwards, in blocks 535, the source device can determine the direction of transmission. Alternatively if they do have reciprocal reception/transmission antennas, then in block 535, the source device can determine the direction of transmission, without performing the calibration. In block 540, the source device can then determine the aperture angle of transmission to the receiving device. Next, in block 545, the source device can again perform a CCA (directional or quasi-omnidirectional, or both) with the determined aperture angle and direction of transmission. In block 550, the source device can access the channel and transmit the data to the receiving device.

Figure 6:
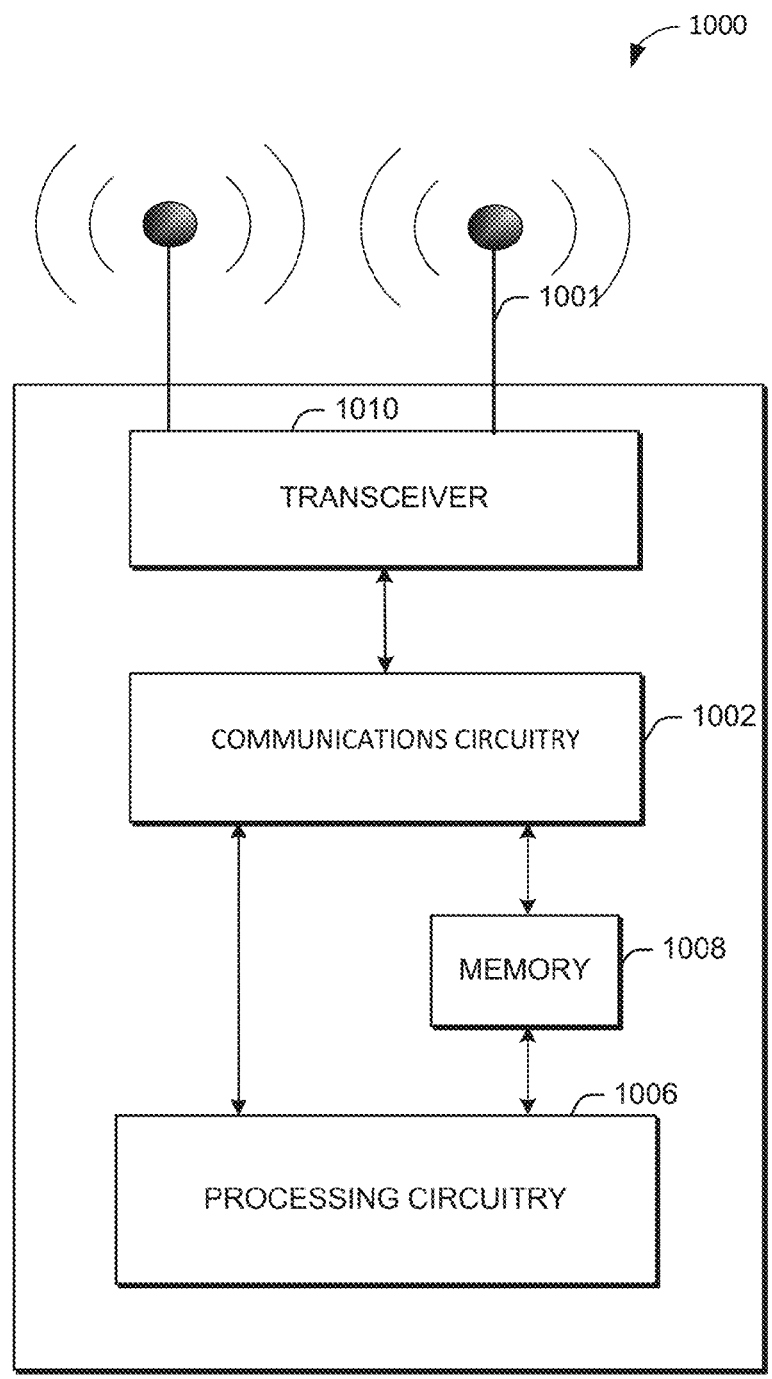
FIG. 6 illustrates a functional diagram of an example communication station that may be suitable for use as a user device, in accordance with one or more example embodiments of the disclosure.

FIG. 6 shows a functional diagram of an exemplary communication station 1000 in accordance with some embodiments. In one embodiment, FIG. 6 illustrates a functional block diagram of a communication station that may be suitable for use as an AP 402 (FIG. 4) or communication station user device 420 (FIG. 4) in accordance with some embodiments. The communication station 1000 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 1000 may include communications circuitry 1002 and a transceiver 1010 for transmitting and receiving signals to and from other communication stations using one or more antennas 1001. The communications circuitry 1002 may include circuitry that can operate the physical layer communications and/or medium access control (MAC) communications for controlling access to the wireless medium, and/or any other communications layers for transmitting and receiving signals. The communication station 1000 may also include processing circuitry 1006 and memory 1008 arranged to perform the operations described herein. In some embodiments, the communications circuitry 1002 and the processing circuitry 1006 may be configured to perform operations detailed in FIGS. 1-5.

In accordance with some embodiments, the communications circuitry 1002 may be arranged to contend for a wireless medium and configure frames or packets for communicating over the wireless medium. The communications circuitry 1002 may be arranged to transmit and receive signals. The communications circuitry 1002 may also include circuitry for modulation/demodulation, upconversion/downconversion, filtering, amplification, etc. In some embodiments, the processing circuitry 1006 of the communication station 1000 may include one or more processors. In other embodiments, two or more antennas 1001 may be coupled to the communications circuitry 1002 arranged for sending and receiving signals. The memory 1008 may store information for configuring the processing circuitry 1006 to perform operations for configuring and transmitting message frames and performing the various operations described herein. The memory 1008 may include any type of memory, including non-transitory memory, for storing information in a form readable by a machine (e.g., a computer). For example, the memory 1008 may include a computer-readable storage device may, read-only memory (ROM), random-access memory (RAM), magnetic disk storage media, optical storage media, flash-memory devices and other storage devices and media.

In some embodiments, the communication station 1000 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1000 may include one or more antennas 1001. The antennas 1001 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1000 may include one or more of a keyboard, a display, a non-volatile memory port, multiple antennas, a graphics processor, an application processor, speakers, and other mobile device elements. The display may be an LCD screen including a touch screen.

Although the communication station 1000 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1000 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1000 may include one or more processors and may be configured with instructions stored on a computer-readable storage device memory.

Figure 7:
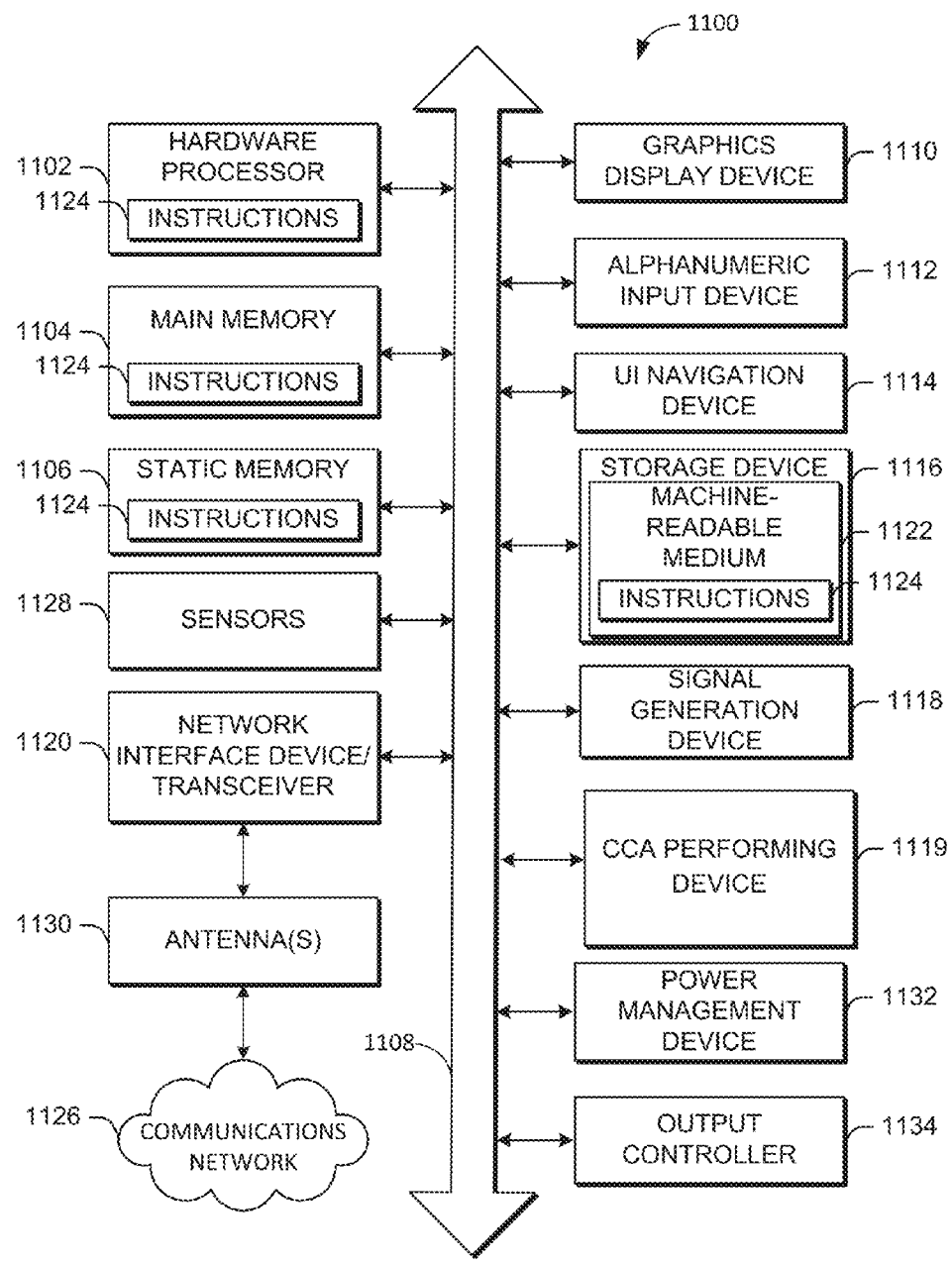
FIG. 7 is a block diagram of an example machine upon which any of one or more techniques (e.g., methods) may be performed, in accordance with one or more embodiments of the disclosure.

FIG. 7 illustrates a block diagram of an example of a machine 1100 or system upon which any one or more of the techniques (e.g., methodologies) discussed herein may be performed. In other embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environments. The machine 1000 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1100 may include a hardware processor 1102 (e.g., a central processing unit (CPU), a graphics processing unit (GPU), a hardware processor core, or any combination thereof), a main memory 1004 and a static memory 1106, some or all of which may communicate with each other via an interlink (e.g., bus) 1108. The machine 1100 may further include a power management device 1132, a graphics display device 1110, an alphanumeric input device 1112 (e.g., a keyboard), and a user interface (UI) navigation device 1114 (e.g., a mouse). In an example, the graphics display device 1110, alphanumeric input device 1112, and UI navigation device 1114 may be a touch screen display. The machine 1100 may additionally include a storage device (i.e., drive unit) 1116, a signal generation device 1118 (e.g., a speaker), a CCA performing device 1119, a network interface device/transceiver 1120 coupled to antenna(s) 1130, and one or more sensors 1128, such as a global positioning system (GPS) sensor, compass, accelerometer, or other sensor. The machine 1100 may include an output controller 1134, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within the static memory 1106, or within the hardware processor 1102 during execution thereof by the machine 1100. In an example, one or any combination of the hardware processor 1102, the main memory 1104, the static memory 1106, or the storage device 1116 may constitute machine-readable media.

The CCA performing device 1119 may be configured to beamform with a second device and a third device to discover and associate with the second device and the third device in a neighborhood of the source device, determine a direction and aperture angle for transmission to the second device and a direction and aperture angle for reception from the second device; determine to transmit data to the second device; perform a directional CCA with the second device and a quasi-omnidirectional CCA with the third device to determine a status associated with the second device and a status associated with the third device; and transceive data from the second device using the direction and the aperture angle for transmission to the second device and the direction and the aperture angle for reception from the second device, and ignoring communications from the third device; or transceive data from the third device and deferring transmission to the second device.

It is understood that the above are only a subset of what the CCA performing device 1119 may be configured to perform and that other functions included throughout this disclosure may also be performed by the CCA performing device 1119.

While the machine-readable medium 1122 is illustrated as a single medium, the term "machine-readable medium" may include a single medium or multiple media (e.g., a centralized or distributed database, and/or associated caches and servers) configured to store the one or more instructions 1124.

The term "machine-readable medium" may include any medium that is capable of storing, encoding, or carrying instructions for execution by the machine 1100 and that cause the machine 1100 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device/transceiver 1120 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1120 may include one or more physical jacks (e.g., Ethernet, coaxial, or phone jacks) or one or more antennas to connect to the communications network 1126. In an example, the network interface device/transceiver 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1100 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

In one embodiment, a device is described, the device including: at least one memory that stores computer-executable instructions; and at least one processor of the one or more processors configured to access the at least one memory, wherein the at least one processor of the one or more processors can be configured to execute the computer-executable instructions to: determine one or more first spatial beams between the device and a second device and determine one or more second spatial beams between the device and a third device to associate with the second device and the third device in a neighborhood of the device, determine a direction and aperture angle for transmission to the second device and a direction and aperture angle for reception from the second device; cause to send data to the second device; perform a directional clear channel assessment (CCA) with the second device and a quasi-omnidirectional CCA with the third device to determine a status associated with the second device and a status associated with the third device.

The instructions further include instructions to cause to send data to the second device using the direction and the aperture angle for transmission to the second device and not processing communications from the third device, based at least in part on the status associated with the second device and a status associated with the third device. The instructions further include instructions to identify data from the second device using the direction and the aperture angle for reception from the second device and not processing communications from the third device, based at least in part on the status associated with the second device and a status associated with the third device. The instructions further include instructions to identify data from the third device and deferring transmission to the second device, based at least in part on the status associated with the second device and a status associated with the third device. The instructions to perform the directional CCA with the second device and the quasi-omnidirectional CCA with the third device further includes instructions to adjust a threshold associated with the directional CCA with the second device or a threshold associated with the quasi-omnidirectional CCA with the third device based on a difference between a quasi-omnidirectional reception gain and a directional reception gain associated with a source antenna of the source device. The instructions further include instructions to determine that at least one of the device, the second device, or the third device do not have reciprocal reception and transmission antennas and performing a calibration between the at least one of the device, the second device, or the third device. The device further includes a transceiver configured to transmit and receive wireless signals. The device further includes an antenna coupled to the transceiver.

In another embodiment, a non-transitory computer-readable medium storing computer-executable instructions id described, which, when executed by a processor, cause the processor to perform operations including: determining one or more first spatial beams between the device and a second device and determine one or more second spatial beams between the device and a third device to associate with the second device and the third device in a neighborhood of the device, determining a direction and aperture angle for transmission to the second device and a direction and aperture angle for reception from the second device; causing to send data to the second device; performing a directional clear channel assessment (CCA) with the second device and a quasi-omnidirectional CCA with the third device to determine a status associated with the second device and a status associated with the third device.

The instructions further include instructions to cause to send data to the second device using the direction and the aperture angle for transmission to the second device and not processing communications from the third device, based at least in part on the status associated with the second device and a status associated with the third device. The instructions further include instructions to identify data from the second device using the direction and the aperture angle for reception from the second device and not processing communications from the third device, based at least in part on the status associated with the second device and a status associated with the third device. The instructions further include instructions to identify data from the third device and deferring transmission to the second device, based at least in part on the status associated with the second device and a status associated with the third device. The instructions to perform the directional CCA with the second device and the quasi-omnidirectional CCA with the third device further includes instructions to adjust a threshold associated with the directional CCA with the second device or a threshold associated with the quasi-omnidirectional CCA with the third device based on a difference between a quasi-omnidirectional reception gain and a directional reception gain associated with a source antenna of the source device. The instructions further include instructions to determine that at least one of the device, the second device, or the third device do not have reciprocal reception and transmission antennas and performing a calibration between the at least one of the device, the second device, or the third device.

In another embodiment, a method is described, the method including: determining one or more first spatial beams between the device and a second device and determine one or more second spatial beams between the device and a third device to associate with the second device and the third device in a neighborhood of the device; determining a direction and aperture angle for transmission to the second device and a direction and aperture angle for reception from the second device; causing to send data to the second device; performing a directional clear channel assessment (CCA) with the second device and a quasi-omnidirectional CCA with the third device to determine a status associated with the second device and a status associated with the third device.

The method further includes transmitting data to the second device using the direction and the aperture angle for transmission to the second device and not processing communications from the third device, based at least in part on the status associated with the second device and a status associated with the third device. The method further includes identifying data from the second device using the direction and the aperture angle for reception from the second device and not processing communications from the third device, based at least in part on the status associated with the second device and a status associated with the third device. The method further includes identifying data from the third device and deferring transmission to the second device, based at least in part on the status associated with the second device and a status associated with the third device. The performing the directional CCA with the second device and the quasi-omnidirectional CCA with the third device further includes adjusting a threshold associated with the directional CCA with the second device or a threshold associated with the quasi-omnidirectional CCA with the third device based on a difference between a quasi-omnidirectional reception gain and a directional reception gain associated with a source antenna of the source device. The method further includes determining that at least one of the device, the second device, or the third device do not have reciprocal reception and transmission antennas and performing a calibration between the at least one of the device, the second device, or the third device.

In one embodiment, an apparatus is described, the apparatus including: a means for determining one or more first spatial beams between the device and a second device and determine one or more second spatial beams between the device and a third device to associate with the second device and the third device in a neighborhood of the device; a means for determining a direction and aperture angle for transmission to the second device and a direction and aperture angle for reception from the second device; transmitting data to the second device; a means for performing a directional clear channel assessment (CCA) with the second device and a quasi-omnidirectional CCA with the third device to determine a status associated with the second device and a status associated with the third device.

The apparatus further includes a means for transmitting data to the second device using the direction and the aperture angle for transmission to the second device and not processing communications from the third device, based at least in part on the status associated with the second device and a status associated with the third device. the apparatus further includes a means for identifying data from the second device using the direction and the aperture angle for reception from the second device and not processing communications from the third device, based at least in part on the status associated with the second device and a status associated with the third device. The apparatus further includes a means for identifying data from the third device and deferring transmission to the second device, based at least in part on the status associated with the second device and a status associated with the third device. The means for performing the directional CCA with the second device and the quasi-omnidirectional CCA with the third device further includes means for adjusting a threshold associated with the directional CCA with the second device or a threshold associated with the quasi-omnidirectional CCA with the third device based on a difference between a quasi-omnidirectional reception gain and a directional reception gain associated with a source antenna of the source device.

The apparatus further includes a means for determining that at least one of the device, the second device, or the third device do not have reciprocal reception and transmission antennas and performing a calibration between the at least one of the device, the second device, or the third device. In one embodiment, an apparatus is described, the apparatus including means for performing a method as claimed in any one of the preceding claims. In one embodiment, a machine-readable storage is described, the machine-readable storage including machine-readable instructions, when executed, to implement a method as claimed in any preceding claim. In one embodiment, a machine-readable storage is described, the machine-readable storage including machine-readable instructions, when executed, to implement a method or realize an apparatus as claimed in any preceding claim.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments can relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, comprising:
   at least one memory that stores computer-executable instructions; and
   at least one processor of the one or more processors configured to access the at least one memory, wherein the at least one processor of the one or more processors is configured to execute the computer-executable instructions to:
   determine one or more first spatial beams between the device and a second device and determine one or more second spatial beams between the device and a third device;
   perform, based on the one or more first spatial beams and the one or more second spatial beams, an association of the device with the second device and the third device, the second device and the third device in a neighborhood of the device;
   determine a direction and aperture angle for transmission to the second device and a direction and aperture angle for reception from the second device;
   cause to send data to the second device based on the direction and aperture angle for transmission;
   perform a directional clear channel assessment (CCA) with the second device to determine a status associated with the second device; and
   perform a quasi-omnidirectional CCA with the third device to determine a status associated with the third device.

2. The device of claim 1, wherein the computer-executable instructions further comprise computer-executable instructions to cause to send data to the second device and delaying communications from the third device, based on the status associated with the second device and the status associated with the third device.

3. The device of claim 1, wherein the computer-executable instructions further comprise computer-executable instructions to identify data from the second device using the direction and the aperture angle for reception from the second device and delay communications from the third device, based on the status associated with the second device and the status associated with the third device.

4. The device of claim 1, wherein the computer-executable instructions further comprise computer-executable instructions to identify data from the third device and delay transmission to the second device, based on the status associated with the second device and the status associated with the third device.

5. The device of claim 1, wherein the computer-executable instructions further comprise computer-executable instructions to adjust a threshold associated with the directional CCA or a threshold associated with the quasi-omnidirectional CCA based on a difference between a quasi-omnidirectional gain and a directional gain associated with an antenna of the device.

6. The device of claim 1, wherein the computer-executable instructions further comprise computer-executable instructions to determine that at least one of the device, the second device, or the third device do not have reciprocal reception and transmission antennas, and performing a calibration between the at least one of the device, the second device, or the third device.

7. The device of claim 1, further comprising a transceiver configured to transmit and receive wireless signals and an antenna coupled to the transceiver.

8. The device of claim 7, further comprising a communication circuitry that determines the data to be sent by the transceiver.

9. A non-transitory computer-readable medium storing computer-executable instructions which, when executed by a processor, cause the processor to perform operations comprising:
   determining one or more first spatial beams between a device and a second device and determine one or more second spatial beams between the device and a third device;
   performing, based on the one or more first spatial beams and the one or more second spatial beams, an association of the device with the second device and the third device, the second device and the third device in a neighborhood of the device;
   determining a direction and aperture angle for transmission to the second device and a direction and aperture angle for reception from the second device;
   causing to send data to the second device based on the direction and aperture angle for transmission;
   performing a directional clear channel assessment (CCA) with the second device to determine a status associated with the second device; and
   performing a quasi-omnidirectional CCA with the third device to determine a status associated with the third device.

10. The non-transitory computer-readable medium of claim 9, wherein the instructions further comprise instructions to cause to send data to the second device and delay communications from the third device, based on the status associated with the second device and the status associated with the third device.

11. The non-transitory computer-readable medium of claim 9, wherein the instructions further comprise instructions to identify data from the second device and delay communications from the third device, based at least in part on the status associated with the second device and the status associated with the third device.

12. The non-transitory computer-readable medium of claim 9, wherein the instructions further comprise instructions to identify data from the third device and delay transmission to the second device, based on the status associated with the second device and the status associated with the third device.

13. The non-transitory computer-readable medium of claim 9, wherein the instructions further comprise instructions to adjust a threshold associated with the directional CCA or a threshold associated with the quasi-omnidirectional CCA based on a difference between a quasi-omnidirectional gain and a directional gain associated with an antenna of the device.

14. The non-transitory computer-readable medium of claim 9, wherein the instructions further comprise instructions to determine that at least one of the device, the second device, or the third device do not have reciprocal reception and transmission antennas and performing a calibration between the at least one of the device, the second device, or the third device.

15. A method, comprising:
   determining one or more first spatial beams between a device and a second device and determine one or more second spatial beams between the device and a third device;
   performing, based on the one or more first spatial beams and the one or more second spatial beams, an association of the device with the second device and the third device, the second device and the third device in a neighborhood of the device;
   determining a direction and aperture angle for transmission to the second device and a direction and aperture angle for reception from the second device;
   sending data to the second device based on the direction and aperture angle for transmission;
   performing a directional clear channel assessment (CCA) with the second device to determine a status associated with the second device; and
   performing a quasi-omnidirectional CCA with the third device to determine a status associated with the third device.

16. The method of claim 15, wherein the method further comprises sending data to the second device and delaying communications from the third device, based on the status associated with the second device and the status associated with the third device.

17. The method of claim 15, wherein the method further comprises identifying data from the second device and delaying communications from the third device, based on the status associated with the second device and the status associated with the third device.

18. The method of claim 15, wherein the method further comprises identifying data from the third device and delaying transmission to the second device, based on the status associated with the second device and the status associated with the third device.

19. The method of claim 15, wherein the method further comprises adjusting a threshold associated with the directional CCA or a threshold associated with the quasi-omnidirectional CCA based on a difference between a quasi-omnidirectional gain and a directional gain associated with an antenna of the device.

20. The method of claim 15, further comprising determining that at least one of the device, the second device, or the third device do not have reciprocal reception and transmission antennas and performing a calibration between the at least one of the device, the second device, or the third device.

* * * * *